Nov. 27, 1962    J. J. HAGAN ETAL    3,066,079
METHODS FOR PURIFYING PLASMINOGEN
Filed Sept. 18, 1959
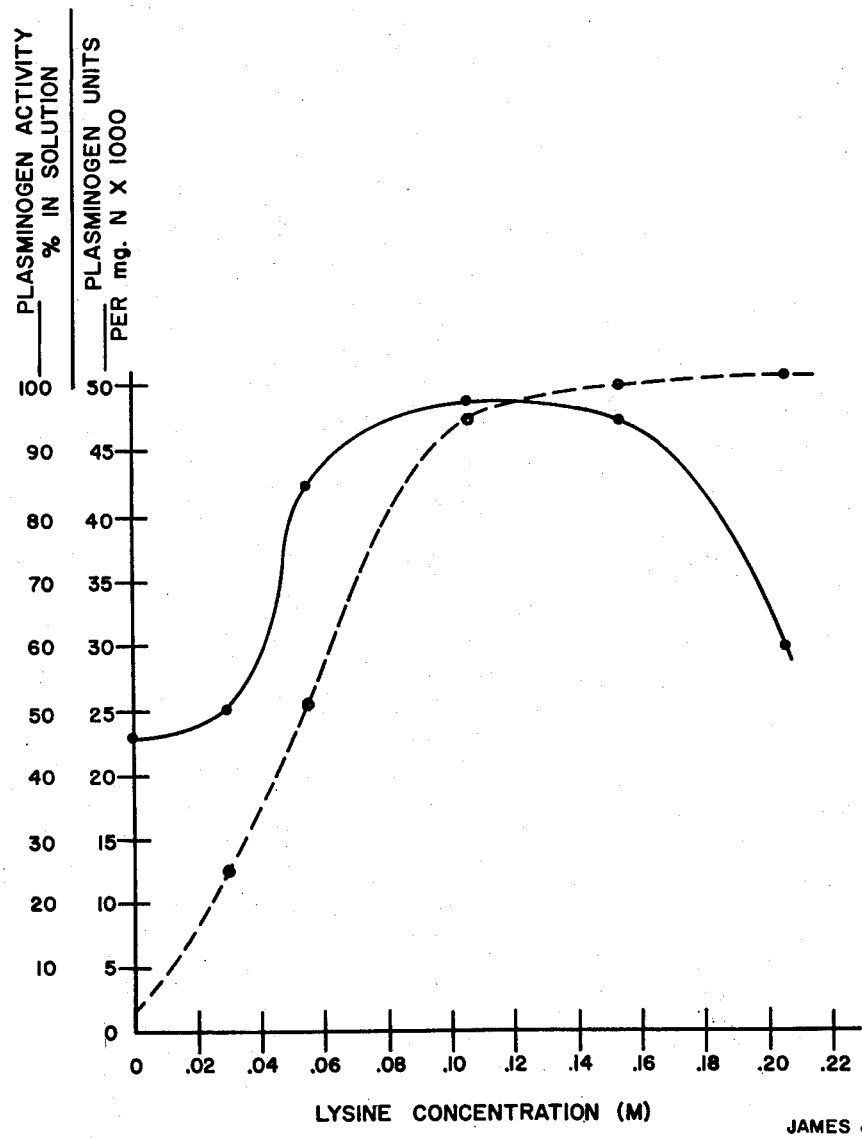
JAMES J. HAGAN
FRANK B. ABLONDI
RALPH E. CLARKE
INVENTOR.
BY
ATTORNEY United States Patent Office 3,066,079
Patented Nov. 27, 1962

3,066,079
METHODS FOR PURIFYING PLASMINOGEN
James J. Hagan, Cedar Grove, N.J., Frank B. Ablondi, Pearl River, N.Y., and Ralph E. Clarke, River Vale, N.J., assignors to American Cyanamid Company, New York, N.Y., a corporation of Maine
Filed Sept. 18, 1959, Ser. No. 840,906
9 Claims. (Cl. 195—66)

This invention relates to an improved method of purifying plasminogen and to an improved soluble plasminogen.

Human plasminogen has important uses in therapy. However, problems have been presented along two lines. In the first place, if plasminogen is to be administered, the higher the concentration the better as this reduces the volume which is needed, for example, in the case of injections, and this applies either where the plasminogen is administered as such or activated to plasmin by a suitable activator. The second problem arises due to the fact that sterility is necessary but it is extremely difficult to sterilize a relatively impure product which is not readily soluble.

In the past, the best method of obtaining a plasminogen concentrate is that described by Kline, J. Biol. Chem., volume 204, beginning at page 949. Kline's method involves an initial extraction of Fraction III with 0.05 g./ml. of 0.05 N $H_2SO_4$ for 10 minutes, followed by centrifugation at 2500 r.p.m. for 10 minutes. The supernate is removed and adjusted to pH 11 with 1.0 N NaOH. After a period of no more than 3 minutes, the pH of the supernate is adjusted to 5.3 with 1.0 N HCl and cooled in a refrigerator for a minimum of 3 hours. The resulting suspension is adjusted to pH 2 with 1.0 N HCl and centrifuged at 2700 r.p.m. for 1 hour. This supernate is removed, adjusted to pH 8.6 with 1.0 N NaOH, and dialyzed against 0.25 M sodium phosphate for 10 minutes. The resulting suspension is cooled in a refrigerator for 1 hour and then centrifuged. This final supernate is the purest plasminogen product which has been obtained hereto and its physical characteristics are described in an article by Shulman, J. Biol. Chem., volume 233 beginning at page 91. For simplicity throughout the specification, this product will be referred to as a Kline product or a Kline method.

According to the present invention, the Kline plasminogen product is purified by either of two general procedures and a much purer product of higher potency and higher activity is obtained. As the higher potency and higher activity results from the removal of contaminating impurities such as other proteins, the product is also more satisfactory as there is less danger of adverse reactions from foreign proteins. Essentially the two processes involve either purification by solubilizing with the bases, salts or esters of lysine, epsilon amino caproic acid, arginine, histamine, histidine or tosyl arginine. These compounds react or associate themselves in some way with the plasminogen rendering it soluble without solubilizing large amounts of other proteins. The other process involves chromatographic purification using carboxymethyl cellulose in ion exchange columns, for example, with a decreasing or increasing pH gradient, smooth or stepped. Salt gradient elution may also be used. The second method may be either continuous or in batch form. The solubilized product can be sterile, filtered with or without activation to plasmin at near physiological pH, and is satisfactory for human parenteral use. At the same time the potency is very markedly increased and so smaller amounts of the more concentrated product may be employed.

In the case of purification by lysine or lysine ester salts or the other amino acid compounds referred to above, it is preferable to produce a solution of 75% or higher plasminogen concentration. The range of amino acid in the case of lysine is from 0.05 to 0.18 mole.

The invention will be illustrated, for the drawing shows curves obtained with different concentrations of lysine. The solid line represents plasminogen units per mg. nitrogen and the dashed line represents percent plasminogen in solution.

The invention will also be illustrated in the specific example and the parts are by weight unless otherwise specified.

EXAMPLE 1

A Kline plasminogen product which had a pH of 8–10 was adjusted to the point of least solubility at pH 5.5 and stirred with various concentrations of lysine hydrochloride. Most of the plasminogen dissolved while much of the impurities remain undissolved, the undissolved proteins were removed by filtration and the supernatant fluid containing plasminogen concentrated to a white powder by freeze drying. The purity, that is to say units of plasminogen per milligram of nitrogen, and percent solubility was determined. The drawing shows the two curves obtained. It will be seen that for a purity of 40,000 units per mg. lysine concentrations between 0.05 and 0.18 were suitable. Maximum purity and solubility are obtained between concentrations of 0.08 and 0.14.

EXAMPLE 2

A procedure of Example 1 was repeated by dissolving one milligram of plasminogen at pH 2.5 adjusted to pH 10 and in the presence of 0.1 mg. lysine hydrochloride the pH adjusted to 5.5, stirred at room temperature and the precipitated impurity centrifuged out. The procedure was then repeated with two other samples of Kline product of somewhat higher purity. The results appear in the following table:

Table

| Purity, units/mg. | | Recovery, Percent |
|---|---|---|
| Kline | Lysine treated | |
| 23,000 | 60,000 | 81 |
| 27,000 | 40,000 | 97 |

EXAMPLE 3

Procedure of Example 2 is repeated replacing the lysine hydrochloride with other amino acid derivatives. Control was checked for plasminogen solubility and showed less than 16%. Solubilities appear in the following table:

Table

| Compound (0.05 M): | Percent plasminogen in solution |
|---|---|
| L-lysine.HCl | 70 |
| L-lysine ethyl ester.2HCl | 82 |
| ε-Amino caproic acid | 68 |
| Tosyl L-arginine methyl ester.HCl | 64 |
| L-arginine methyl ester.HCl | 60 |
| Histamine.2HCl | 50 |
| L-histidine.HCl | 44 |
| L-arginine.HCl | 35 |

EXAMPLE 4

Ten grams of carboxymethyl cellulose were washed several times in 1 M hydrochloric acid followed by water washing, the pH was then adjusted to 2.75 with 0.01 M sodium formate, buffer adjustment being with formic acid. A thin slurry of the carboxymethyl cellulose was then added to a chromatographic column under 10 pounds pressure to a volume of 28 milliliters, column measures 0.92 x 43 cm. 675 optical density ($D_{280}$) units of Kline plasminogen product would be equilibrated by dialysis in the same buffer, was then added to the top of the column and allowed to adsorb. A gradient elution system was set up in which 0.1 M hydrochloric acid was gradually added with mixing to a formate buffer at pH 2.75 producing a gradually decreasing pH gradient. About one-half of the total protein containing no more than 5% of the plasminogen flowed through the column immediately. Plasminogen was then eluted at approximately pH 2.2 and the fractions pooled and determined by assay and protein determination. The purity and recovery are as follows: Kline starting material, 36,000 units/mg. N; chromatographed plasminogen, 86,000 units/mg. N; recovery, 82%.

EXAMPLE 5

The procedure of Example 4 was repeated but instead of a decreasing pH elution an increasing pH elution was obtained by using 0.01 molar sodium formate buffer at pH 3 to equilibrate the carboxymethyl cellulose and a gradient elution system prepared by mixing 0.25 molar sodium citrate, 0.1 molar lysine buffer at pH 6.5 with the formate buffer. This produced an elution with increasing pH and gave the following results: Kline starting material, 63,000 units/mg. N; chromatographed plasminogen, 102,600 units/mg. N; recovery, 41.7%.

EXAMPLE 6

The elution was varied by making a batchwise adsorption as follows: Kline plasminogen product was diluted at pH 2.8 using 0.05 M sodium formate buffer, to approximately 0.2 mg. N/ml. Ten grams of washed carboxymethyl cellulose were added to 100 ml. of the diluted plasminogen and mixed slowly for one hour at room temperature. Filtration with suction was then effected and the carboxymethyl cellulose resuspended in the same amount of buffer, stirred for one-half hour and refiltered. The carboxymethyl cellulose cake was then resuspended in buffer and adjusted to pH 2 with normal hydrochloric acid, mixed for an hour and filtered. A second elution at pH 2 with normal hydrochloric acid was then effected by mixing the cake therewith. The two eluates were combined, concentrated by dialysis and dried. The purity and recovery is as follows: Kline starting material, 52,000 units/mg. N; batch adsorbed and eluted, 75,000 units/mg. N; recovery, 58%.

We claim:

1. In a process of purifying plasminogen which comprises slurrying plasma Fraction III with dilute sulfuric acid and separating solids from the suspension thereby producing a first extract, adjusting the pH of the first extract first to 11 for no more than 3 minutes and then to 5.3 with cooling for no less than 3 hours, adjusting the pH of the resulting suspension to 2 and separating solids from the suspension thereby producing a second extract, adjusting the pH of the second extract to 8.6 and dialyzing against 0.25 M sodium phosphate, cooling the resulting suspension and separating solids from the suspension thereby producing a plasminogen concentrate; the improvement which comprises adjusting the pH of said plasminogen concentrate to 5.5, adding to the resulting suspension a water solution of 0.05 to 0.18 molar concentration of a lysine compound selected from the group consisting of lysine, lysine salts and lysine esters, separating solids from the suspension and concentrating the so obtained extract to a dry powder.

2. In a process of purifying plasminogen which comprises slurrying plasma Fraction III with dilute sulfuric acid and separating solids from the suspension thereby producing a first extract, adjusting the pH of the first extract first to 11 for no more than 3 minutes and then to 5.3 with cooling for no less than 3 hours, adjusting the pH of the resulting suspension to 2 and separating solids from the suspension thereby producing a second extract, adjusting the pH of the second extract to 8.6 and dialyzing against 0.25 M sodium phosphate, cooling the resulting suspension and separating solids from the suspension thereby producing a plasminogen concentrate; the improvement which comprises adjusting the pH of said plasminogen concentrate to 5.5, adding to the resulting suspension a water solution of 0.05 to 0.18 molar concentration of lysine hydrochloride, separating solids from the suspension and concentrating the so obtained extract to a dry powder.

3. In a process of purifying plasminogen which comprises slurrying plasma Fraction III with dilute sulfuric acid and separating solids from the suspension thereby producing a first extract, adjusting the pH of the first extract first to 11 for no more than 3 minutes and then to 5.3 with cooling for no less than 3 hours, adjusting the pH of the resulting suspension to 2 and separating solids from the suspension thereby producing a second extract, adjusting the pH of the second extract to 8.6 and dialyzing against 0.25 M sodium phosphate, cooling the resulting suspension and separating solids from the suspension thereby producing a plasminogen concentrate; the improvement which comprises adjusting the pH of said plasminogen concentrate to 5.5, adding to the resulting suspension a water solution of 0.05 to 0.18 molar concentration of an epsilon amino caproic acid compound selected from the group consisting of epsilon amino caproic acid, epsilon amino caproic acid salts and epsilon amino caproic acid esters, separating solids from the suspension and concentrating the so obtained extract to a dry powder.

4. In a process of purifying plasminogen which comprises slurrying plasma Fraction III with dilute sulfuric acid and separating solids from the suspension thereby producing a first extract, adjusting the pH of the first extract first to 11 for no more than 3 minutes and then to 5.3 with cooling for no less than 3 hours, adjusting the pH of the resulting suspension to 2 and separating solids from the suspension thereby producing a second extract, adjusting the pH of the second extract to 8.6 and dialyzing against 0.25 M sodium phosphate, cooling the resulting suspension and separating solids from the suspension thereby producing a plasminogen concentrate; the improvement which comprises adjusting the pH of said plasminogen concentrate to 5.5, adding to the resulting suspension a water solution of 0.05 to 0.18 molar concentration of an arginine compound selected from the group consisting of arginine, arginine salts and arginine esters, separating solids from the suspension and concentrating the so obtained extract to a dry powder.

5. In a process of purifying plasminogen which comprises slurrying plasma Fraction III with dilute sulfuric acid and separating solids from the suspension thereby producing a first extract, adjusting the pH of the first extract first to 11 for no more than 3 minutes and then to 5.3 with cooling for no less than 3 hours, adjusting the pH of the resulting suspension to 2 and separating solids from the suspension thereby producing a second extract, adjusting the pH of the second extract to 8.6 and dialyzing against 0.25 M sodium phosphate, cooling the resulting suspension and separating solids from the suspension thereby producing a plasminogen concentrate; the improvement which comprises adjusting the pH of said plasminogen concentrate to 5.5, adding to the resulting suspension a water solution of 0.05 to 0.18 molar concentration of a histamine compound selected from the group consisting of histamine, histamine salts and histamine esters, separating solids from the suspension and concentrating the so obtained extract to a dry powder.

6. In a process of purifying plasminogen which comprises slurrying plasma Fraction III with dilute sulfuric acid and separating solids from the suspension thereby producing a first extract, adjusitng the pH of the first extract first to 11 for no more than 3 minutes and then to 5.3 with cooling for no less than 3 hours, adjusting the pH of the resulting suspension to 2 and separating solids from the suspension thereby producing a second extract, adjusting the pH of the second extract to 8.6 and dialyzing against 0.25 M sodium phosphate, cooling the resulting suspension and separating solids from the suspension thereby producing a plasminogen concentrate; the improvement which comprises adjusting the pH of said plasminogen concentrate to 5.5, adding to the resulting suspension a water solution of 0.05 to 0.18 molar concentration of a histidine compound selected from the group consisting of histidine, histidine salts and histidine esters, separating solids from the suspension and concentrating the so obtained extract to a dry powder.

7. In a process of purifying plasminogen which comprises slurrying plasma Fraction III with dilute sulfuric acid and separating solids from the suspension thereby producing a first extract, adjusting the pH of the first extract first to 11 for no more than 3 minutes and then to 5.3 with cooling for no less than 3 hours, adjusting the pH of the resulting suspension to 2 and separating solids from the suspension thereby producing a second extract, adjusting the pH of the second extract to 8.6 and dialyzing against 0.25 M sodium phosphate, cooling the resulting suspension and separating solids from the suspension thereby producing a plasminogen concentrate; the improvement which comprises adsorbing said plasminogen concentrate on carboxymethyl cellulose at a pH of 2.5 to 3.5 and eluting with an aqueous acid.

8. In a process of purifying plasminogen which comprises slurrying plasma Fraction III with dilute sulfuric acid and separating solids from the suspension thereby producing a first extract, adjusting the pH of the first extract first to 11 for no more than 3 minutes and then to 5.3 with cooling for no less than 3 hours, adjusting the pH of the resulting suspension to 2 and separating solids from the suspension thereby producing a second extract, adjusting the pH of the second extract to 8.6 and dialyzing against 0.25 M sodium phosphate, cooling the resulting suspension and separating solids from the suspension thereby producing a plasminogen concentrate; the improvement which comprises adsorbing said plasminogen concentrate on carboxymethyl cellulose at a pH of 2.5 to 3.5 and eluting with an aqueous eluant producing an increasing pH gradient, the eluant containing an amino acid compound.

9. A process according to claim 8 in which the amino acid compound is lysine.

References Cited in the file of this patent

UNITED STATES PATENTS

| | | |
|---|---|---|
| 2,897,123 | Singher | July 28, 1959 |
| 2,923,665 | Hagan et al. | Feb. 2, 1960 |
| 2,939,817 | Nagasawa et al. | June 7, 1960 |
| 2,985,560 | Homan et al. | May 23, 1961 |
| 2,996,428 | Jager | Aug. 15, 1961 |
| 3,003,918 | Sanders et al. | Oct. 10, 1961 |

OTHER REFERENCES

Troll: J. Biol. Chem., vol. 208, May 1954, pages 85–93.

Kline: Yale J. Biol. and Med., 26:5, 1954, pages 365–371.

Annals N.Y. Acd. of Sci., Chromatography, vol. XLIX, Art 2, Feb. 10, 1948, pages 318–320.

Kline: J. Biol. Chem., 204:2, October 1953, pages 949–955.

Remmert: J. Biol. Chem., vol. 181, 1949, pages 431–447.